US008140991B2

(12) United States Patent
Smith et al.

(10) Patent No.: US 8,140,991 B2
(45) Date of Patent: Mar. 20, 2012

(54) DRAG AND DROP RULE TOPOLOGY

(75) Inventors: Michael Jason Smith, Raleigh, NC (US); Elizabeth Ann Black-Ziegelbein, Iowa City, IA (US); Tsu-Phin Hee, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1168 days.

(21) Appl. No.: 11/932,606

(22) Filed: Oct. 31, 2007

(65) Prior Publication Data

US 2009/0113331 A1 Apr. 30, 2009

(51) Int. Cl.
*G06F 3/048* (2006.01)

(52) U.S. Cl. ........................................ 715/769; 715/854

(58) Field of Classification Search .................. 715/769, 715/853, 854

See application file for complete search history.

(56) References Cited

U.S. PATENT DOCUMENTS

| | | | | |
|---|---|---|---|---|
| 5,710,894 | A * | 1/1998 | Maulsby et al. | 715/763 |
| 6,473,896 | B1 * | 10/2002 | Hicken et al. | 717/132 |
| 7,096,210 | B1 * | 8/2006 | Kramer et al. | 706/45 |
| 7,836,427 | B1 * | 11/2010 | Li et al. | 717/117 |
| 2002/0091700 | A1 * | 7/2002 | Steele et al. | 707/100 |
| 2006/0080599 | A1 * | 4/2006 | Dubinsky | 715/513 |
| 2006/0277585 | A1 * | 12/2006 | Error et al. | 725/112 |
| 2007/0005583 | A1 * | 1/2007 | Chau et al. | 707/4 |
| 2007/0245257 | A1 * | 10/2007 | Chan et al. | 715/769 |
| 2008/0115104 | A1 * | 5/2008 | Quinn | 717/101 |

* cited by examiner

*Primary Examiner* — Omar Abdul-Ali

(74) *Attorney, Agent, or Firm* — Cuenot, Forsythe & Kim, LLC

(57) ABSTRACT

The Rule Editing Program (REP) displays a rule in a hierarchical tree topology, wherein individual rule portions can be reordered by moving them to different locations within the rule using drag and drop interaction. Dragging and dropping rule portions results in the rule itself being changed accordingly. Additionally, new rule portions can be added to any part of the rule, including the beginning, middle and end. Finally, the entire rule, and individual rule portions, can be expanded all the way out, and collapsed all the way in.

18 Claims, 5 Drawing Sheets

710
1. ☐ not (node_name = 'myName' OR (node_hostname like '%.ibm.com') AND not node_property$memory = '2000' OR node name = 'superNode'
2. ☐ not (node_name = 'myName' OR node_hostname like '%.ibm.com')
3. node name = myName
4. OR
5. node hostName like '%.ibm.com'
6. AND
7. node property$memory = '2000'
8. OR
9. node name = 'superNode'
10.

720

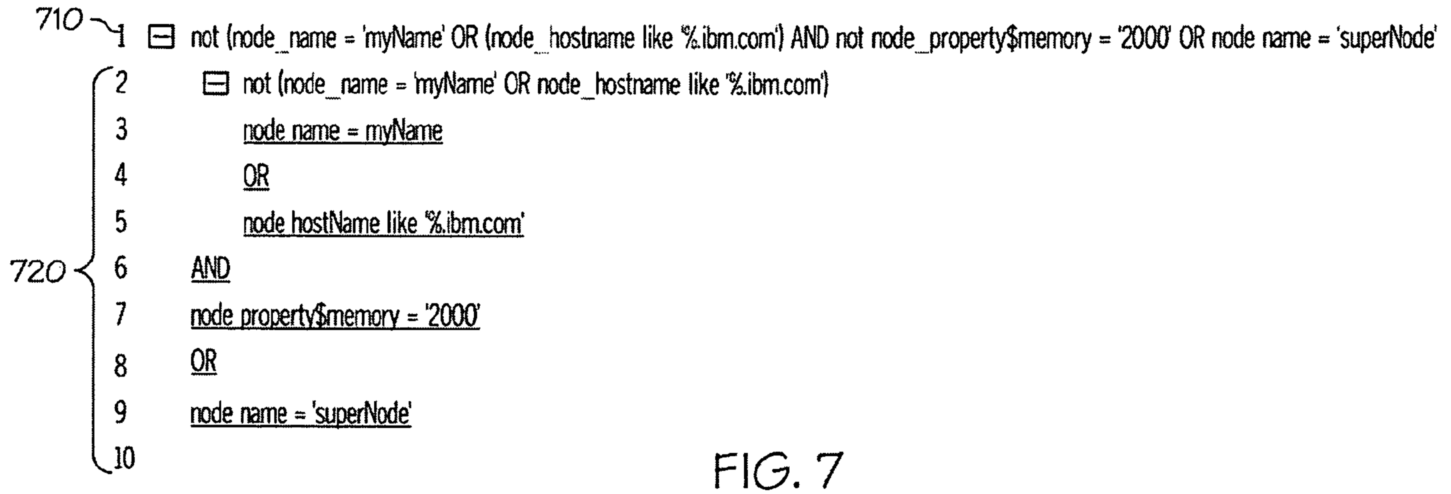

FIG. 7

810
1. ☐ not (node_name = 'myName') OR node_name = 'superNode' AND (node_hostname like '%.ibm.com' AND not node_property$memory = '2000')
2. not (node_name = 'myName')
3. OR
4. node name = 'superNode'
5. AND
6. ☐ node_hostname like '%.ibm.com' AND not node_property$memory = '2000'
7. node hostName like '%.ibm.com'
8. AND
9. node property$memory = '2000'
10.

820

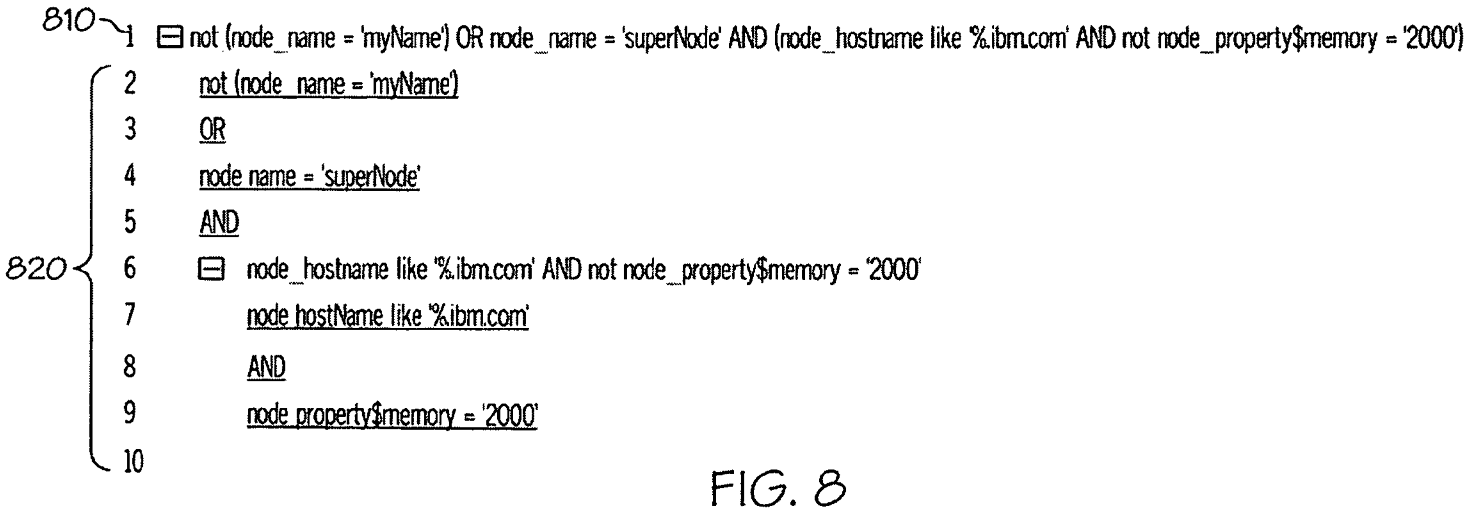

FIG. 8

DRAG AND DROP RULE TOPOLOGY

FIELD OF THE INVENTION

The present invention relates generally to data processing and specifically to modifying rules using a hierarchical display by dragging and dropping rule elements.

BACKGROUND OF THE INVENTION

One way to extend the capabilities of computers and applications to make decisions automatically is to provide access to a file containing rules. Then, if a user desires to change operations performed or conditions necessary for performance, the user need only modify the rule. The user does not need to rewrite code for an application every time a change is necessary. Rather the user goes to the rules file and edits the rule.

One example of the use of rules is the logical topology of a network describing the path taken by data from one node to another. The rule represents the path taken at each node with logical statements. For example, a dynamic cluster membership policy comprises of a rule that can be edited. An exemplary dynamic cluster membership policy rule could be made up of various rule portions and/or rule groups such as "nodegroup like 'node*' AND nodeproperty$memory='2000')." The membership policy helps dynamically define the servers that should be associated with this dynamic cluster. The above exemplary rule would match any server on a node named 'node*' (where '*' is a wildcard) with node property named 'memory' that has a value of '2000'. It is important for administrators to update this membership policy as conditions in their environment change. It is also equally important for administrators to be able to look at the membership policy (or rule) and see what they have defined as the membership rules.

Another example of rule use is a work class classification rule. Work class classification rules have a different purpose than membership policy rules. These rules help administrators define what, when and where different requests should be routed. For example, a rule such as—clientipv4 like '192.168.0.*' AND time$Tues='13:00')—matches any request coming in that is coming from the IP address of '192.168.0.*' (where '*' is a wildcard) at 1 pm on any Tuesday. The portion of the rule—clientipv4 like '192.168.0.*—is referred to as a rule element or a rule portion. As used herein rule element and rule portion shall have the same meaning. The portion of the rule—AND—is an operator. As used herein, the term operator shall mean AND or OR. As used herein, a rule group is a logical grouping of two or more elements and one or more connectors. In other words a rule group is a subset of a rule that has at least two elements and a connector.

Once the rule is defined it is also possible to associate specific actions to take when the rule is satisfied. In this case, once the request is determined to match a rule it can then take this action. Typically this can be to reject service to the request, allow the request to reach the web application, or redirect to a different location. As used herein, the term rule means a logical statement comprising a rule element alone or a combination of rule elements and operators.

Logical statements, or rules, quickly grow very long and hard to read. Some editing tools exist. For example, FIG. 2 depicts prior art graphical user interface 170 for editing rules regarding electronic mail. Line 150 is a rule element which states "sender contains miksmith." Line 152 comprises an operator "AND" and a second rule element "sender contains yes." Line 154 comprises an operator "AND." Line 156 comprises a rule element "sender does not start with helloMyNameIs." Line 158 comprises an operator "AND." Line 160 comprises an unfinished rule element "sender contains . . . " Thus in the example the rule would be "Sender contains miksmith AND sender contains yes AND sender does not start with helloMyNameIs." The unfinished rule element is not included. The graphical user interface only allows changes to certain portions of a rule element and to add rule elements at the end. But it does not allow changes to the order of the elements. Moreover, it does not provide a combined view of the entire rule and the rule portions. Finally, it does not allow a user to choose where to add in additional rule portions, but only adds rules portions to the end of the rule.

Therefore, a need exists for a way to easily reorder rule portions so that a user does not have to delete the rule portion from a first location and then manually add the rule portion back into a second location. A need exists for a way to edit rules without having to retype portions of the rule, a process in which errors can occur. A further need exists for a method of editing rules where additional rule portions may be added anywhere and not only at the end of the rule. A further need exists to make rules easier to read for editing, they can be shown in a hierarchical tree view, with complex rule portions being further expandable.

SUMMARY OF THE INVENTION

The Rule Editing Program (REP) displays a rule in a hierarchical tree topology, wherein individual rule portions can be reordered by moving them to different locations within the rule using drag and drop interaction. Dragging and dropping rule portions results in the rule itself being changed accordingly. Additionally, new rule portions can be added to any part of the rule, including the beginning, middle and end. Finally, the entire rule, and individual rule portions, can be expanded all the way out, and collapsed all the way in.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 7 depicts a third state of an exemplary rule displayed by the Rules Editing Program; and FIG. 8 depicts a fourth state of an exemplary rule displayed by the Rules Editing Program.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Rule Editing Program" or "REP."

Figure 1:
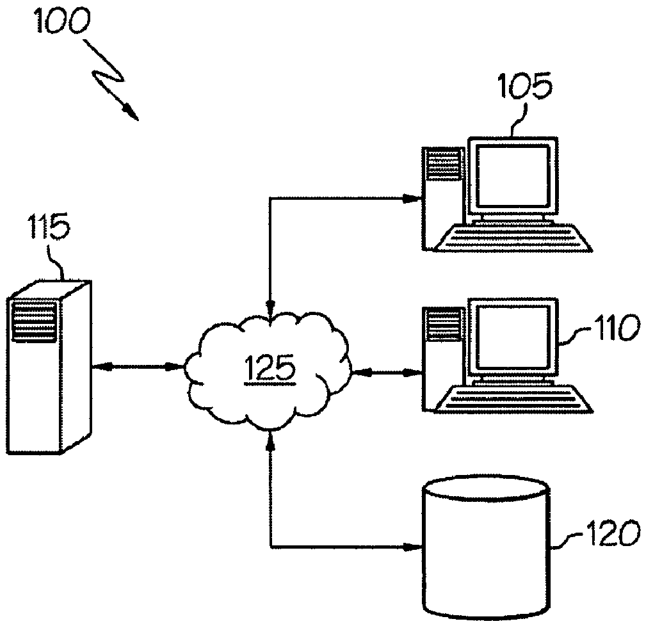
FIG. 1 is an exemplary computer network.
Figure 2:
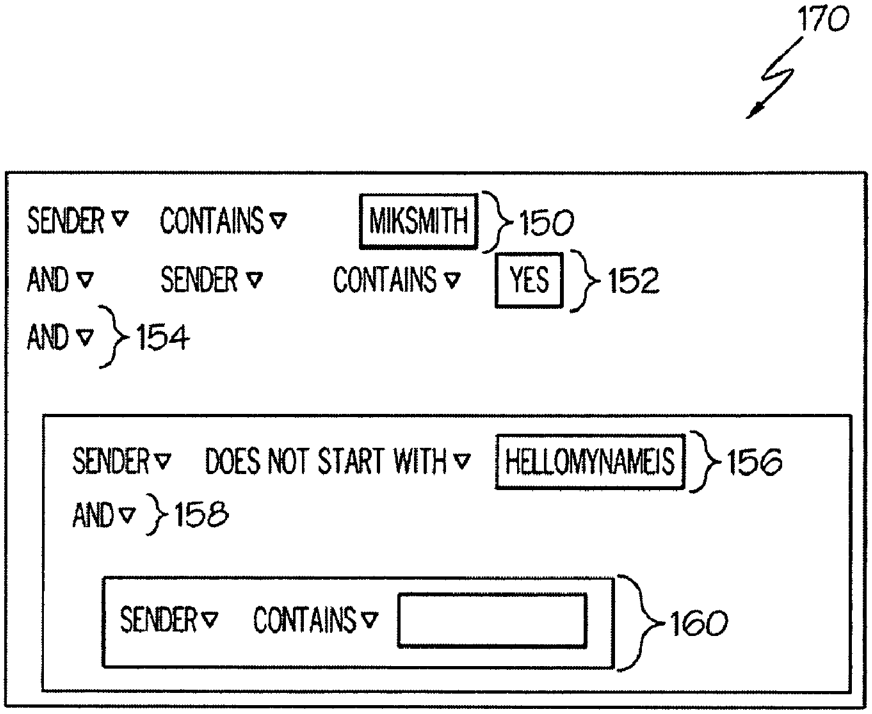
FIG. 2 depicts a prior art rule editing tool.

Additionally, the REP is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 3:
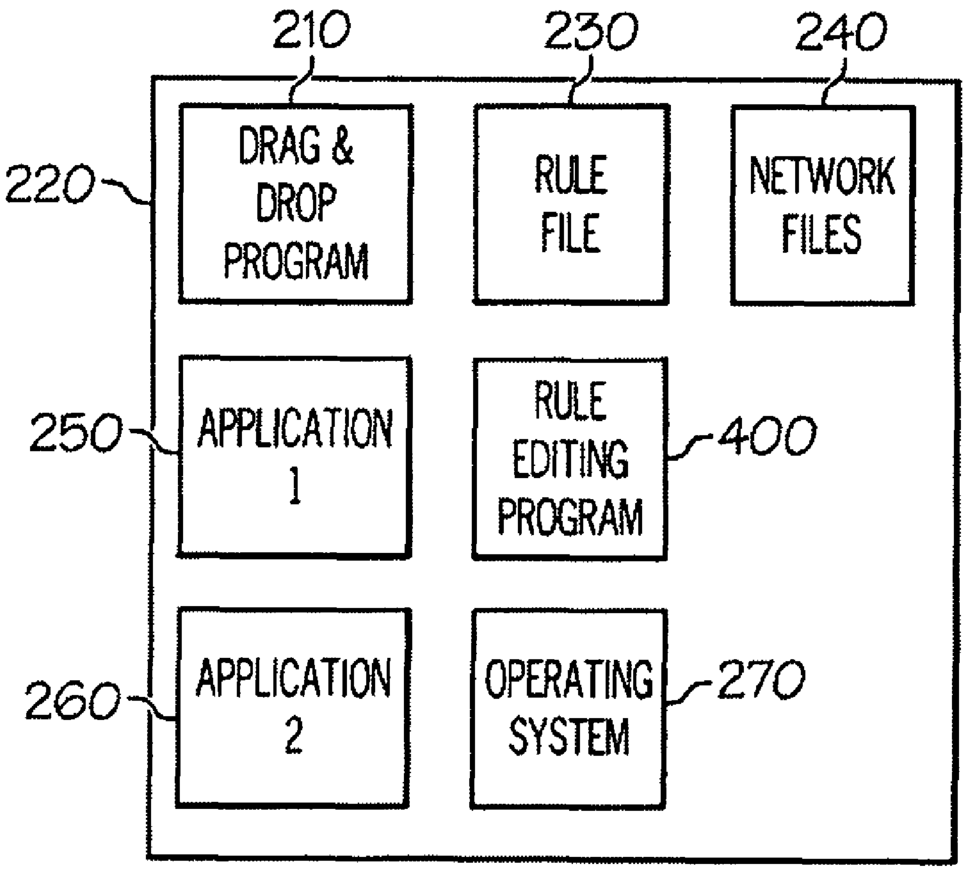
FIG. 3 depicts programs and files in a memory on a computer.

REP 400 typically is stored in a memory, represented schematically as memory 220 in FIG. 3. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further REP 400 may reside in more than one memory distributed across different computers, servers, logical partitions, or other hardware devices. The elements depicted in memory 220 may be located in or distributed across separate memories in any combination, and REP 400 may be adapted to identify, locate and access any of the elements and coordinate actions, if any, by the distributed elements. Thus, FIG. 3 is included merely as a descriptive expedient and does not necessarily reflect any particular physical embodiment of memory 220. As depicted in FIG. 3, though, memory 220 may include additional data and programs. Of particular import to REP 400, memory 220 includes drag and drop program 210, rule file 230, network files 240, application 1 250, application 2 260 and operating system 270.

Figure 4:
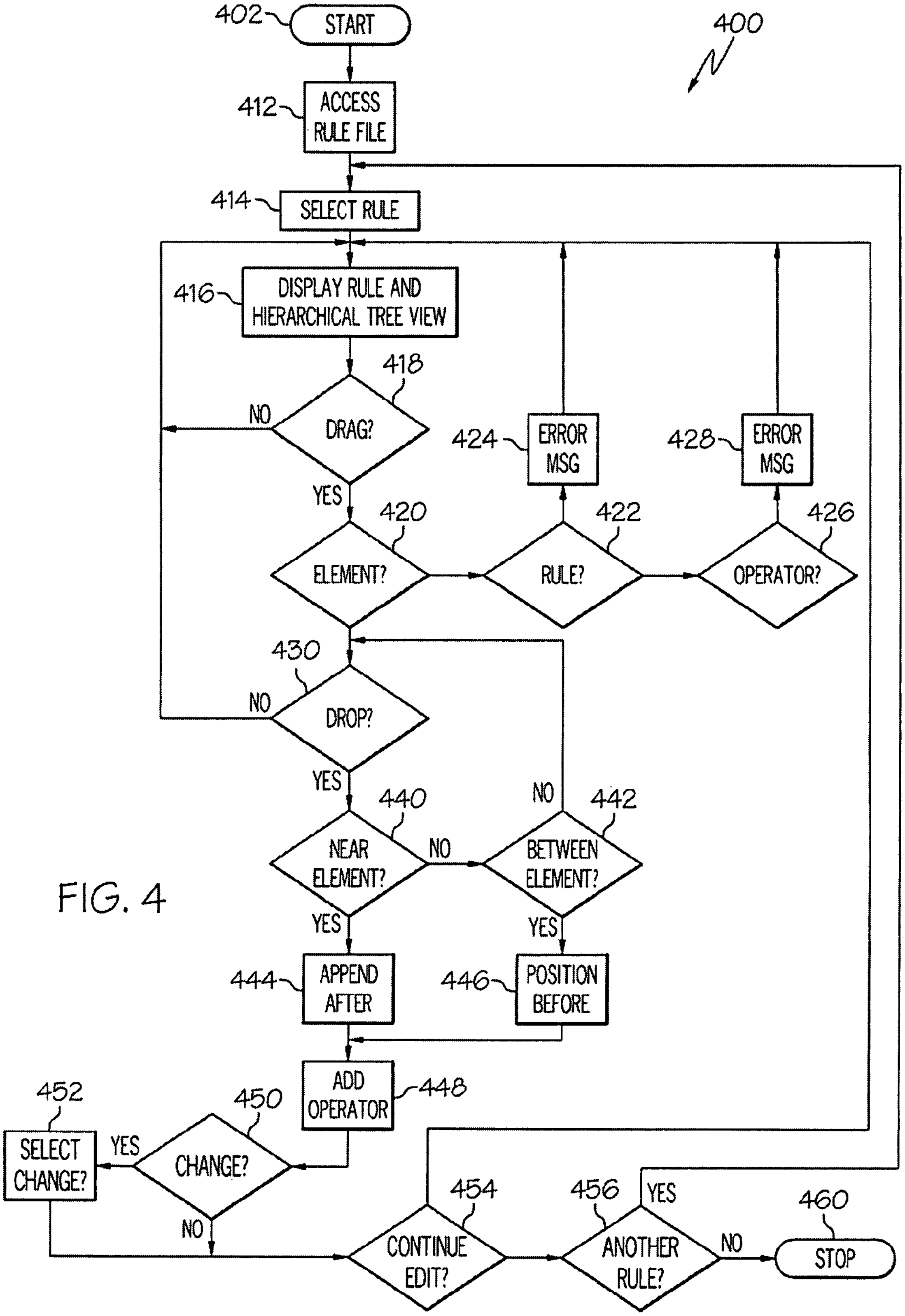
FIG. 4 depicts a flow chart of the Rules Editing Program.

Referring to FIG. 4, REP 400 starts (402) and accesses rules file 230 (412). The user selects a rule (414) and REP 400 displays the entire rule and also the rule in a hierarchical tree view (416). These views and operations by REP 400 will be discussed further below in the examples of FIGS. 5-8. REP 400 determines whether the user is attempting to drag a portion of the hierarchical tree display (418). If the user attempts to drag a portion of the hierarchical tree display, then REP 400 determines whether the portion selected by the user is an element (420), a rule (422), or an operator (426). If the use is attempting to drag an element REP 400 will proceed, but if the user is attempting to drag an entire rule (422) or an operator (426), error messages will be displayed (424 and 428), and REP 400 will return to step 416 displaying the rule and hierarchical tree display.

When the user attempts to drag an element, REP 400 will determine whether the user is dropping the element (430). If the user is not dropping the element, REP 400 returns to step 416. If REP 400 determines that the user is dropping the element, REP 400 determines whether the drop is near another element (440) or between the element or another element and an operator (442). If the drop is near an element, REP 400 will append the dragged element after the element (444). If the drop is between the element or another element and an operator, then REP 400 positions the dragged element before the other element or operator. If the drop is neither near or between, then REP 400 returns to step 430.

When the dragged element is appended after or before, REP 400 places an ADD operator before or after the dragged element respectively (448). If the user desires to change the default ADD to an OR, the user right clicks and selects "change to OR" from a drop down menu (not shown). When the change is completed, REP 400 determines whether the user wants to continue the edit (454). If so, REP 400 returns to step 416. If REP 400 determines that the user does not want to continue the edit, it determines whether the user wants to edit another rule (456). If so, it goes to step 414, and if not REP 400 ends (460).

Figure 5:
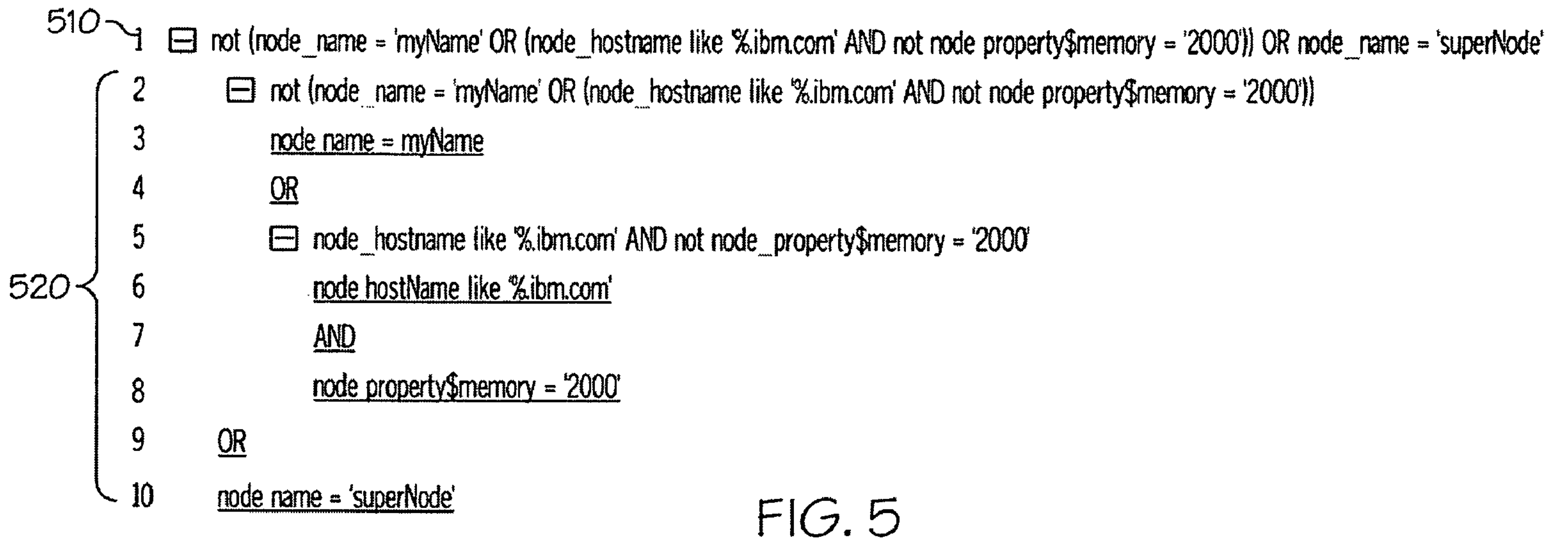
FIG. 5 depicts a first state of an exemplary rule displayed by the Rules Editing Program.

FIGS. 5 through 8 depict examples of the operation of REP 400. FIG. 5 depicts entire rule 510 displayed in line 1 of the display. Entire rule 510 is then displayed in hierarchical tree format (hereafter "tree") 520 comprising lines 2 through 10 of the display. Tree format 520 is ready for editing. If the user attempts to drag line 1, REP 400 will not allow the operation since line 1 is a complete rule. If the user attempts to drag lines 4, 7, or 9, REP 400 will not allow the operation because those lines are operators. In these cases REP 400 would also display an error message.

Figure 6:
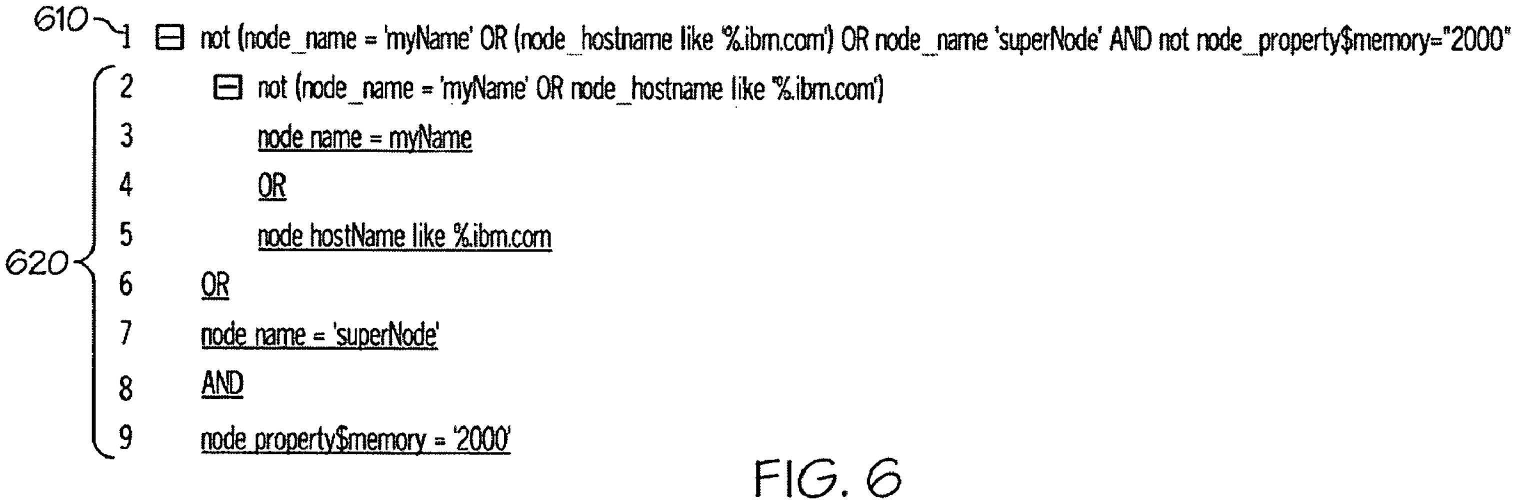
FIG. 6 depicts a second state of an exemplary rule displayed by the Rules Editing Program.

Referring to FIG. 5 and FIG. 6, an example is depicted where the user drags line 8 of tree 520 and drops line 8 near line 10 of tree 520. Since line 8 of tree 520 was dropped near line 10 of tree 520, REP 400 places line 8 behind line 10 so that it will appear as seen in line 9 of tree 620 in FIG. 6. Adding a rule element requires either an additional AND or OR. REP 400 always appends with an AND as shown on line 8 of tree 620. The AND can be changed to an OR by right clicking on it and selecting "Change to OR" in a menu (not shown). Based on this action line 8 of tree 520 has been moved from the rule group in line 5 of tree 520 and its location in the complete rule 510 has been changed to its position in line 1 of complete rule 610. FIG. 6 depicts the changes to both the entire rule and the tree of FIG. 5.

Referring to FIGS. 5 and 7, the user drags line 8 of tree 520 between line 8 and line 9 of tree 520. Note that the only difference from the example above is the order of the placement. Line 8 is now placed ahead of lines 9 & 10 in tree 720 instead of behind lines 9&10. An operator AND is always added when an operator is needed. Since line 8 of FIG. 5 was being placed ahead of an operator it still needed an AND to connect it in the rule.

Referring to FIG. 5 and FIG. 8, the rule group from line 5 of tree 520 is added to the end of line 1 of rule 510. The result is that line 5 of tree 520 is removed from the rule group in line 2 of tree 520. Since REP 400 always appends at the end, the rule group from line 5 of tree 520 is moved to the end of tree 820. Line 2 of tree 520 is now reduced to a single rule element in line 2 of tree 820.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for editing rules, comprising:
- accessing a rules file;
- selecting a rule from the rules file;
- displaying both the rule and a hierarchical tree format representation of the rule;
- selecting a rule element within the hierarchical tree format representation of the rule;
- dropping the rule element to a new location within the hierarchical tree format representation of the rule, wherein
- upon the rule element being dropped,
  - a position of the rule element is automatically changed both within the rule and within the hierarchical tree format representation of the rule, and
  - a new operator is added and an old operator is deleted.

2. The computer implemented process of claim 1, wherein a drop of a complete rule or an operator is not permitted.

3. The computer implemented process of claim 1, further comprising
- expanding the hierarchical tree element fully out or in.

4. The computer implemented process of claim 1, further comprising:
- changing a hierarchical position of a non-selected rule element in the hierarchical tree format representation of the rule upon the selected rule element being dropped.

5. The computer implemented process of claim 1, further comprising:
- displaying a proposed alternative new operator; and
- upon a user selecting the proposed alternative new operator, replacing the new operator with the proposed alternative new operator.

6. The computer implemented process of claim 1, wherein the rules file is a work classification rules file.

7. An apparatus comprising:
- a processor connected to a memory;
- a rule editing program encoded in the memory, the rule editing program containing instructions encoded thereon, to cause the computer to perform the following:
  - accessing a rules file;
  - selecting a rule from the rules file;
  - displaying both the rule and a hierarchical tree format representation of the rule;
  - selecting a rule element within the hierarchical tree format representation of the rule;
  - dropping the rule element to a new location within the hierarchical tree format representation of the rule, wherein
- upon the rule element being dropped,
  - a position of the rule element is automatically changed both within the rule and within the hierarchical tree format representation of the rule, and
  - a new operator is added, and an old operator is deleted.

8. The apparatus of claim 7, wherein
- the rule editing program further causes the processor to not allow a drop of a complete rule or an operator.

9. The apparatus of claim 7 wherein
- the rule editing program further causes the processor to allow the hierarchical tree element to expand fully out or in.

10. The apparatus of claim 7, wherein the rule editing program further causes the processor to perform:
- changing a hierarchical position of a non-selected rule element in the hierarchical tree format representation of the rule upon the selected rule element being dropped.

11. The apparatus of claim 7, wherein the rule editing program further causes the processor to perform:
- displaying a proposed alternative new operator; and
- upon a user selecting the proposed alternative new operator, replacing the new operator with the proposed alternative new operator.

12. The apparatus of claim 7, wherein
- the rules file is a work classification rules file.

13. A computer readable memory comprising a computer readable storage medium having stored therein a computer program for causing a computer to modify activation of web page navigational links, the computer program, which when executed by a computer hardware system, causes the computer hardware system to perform:
- accessing a rules file;
- selecting a rule from the rules file;
- displaying both the rule and a hierarchical tree format representation of the rule;
- selecting a rule element within the hierarchical tree format representation of the rule;
- dropping the rule element to a new location within the hierarchical tree format representation of the rule, wherein
- upon the rule element being dropped,
  - a position of the rule element is automatically changed both within the rule and within the hierarchical tree format representation of the rule, and
  - a new operator is added, and an old operator is deleted.

14. The computer readable memory of claim 13, wherein a drop of a complete rule or an operator is not permitted.

15. The computer readable memory of claim 13, wherein the computer program further causes the computer hardware system to perform
- expanding the hierarchical tree element fully out or in.

16. The computer readable memory of claim 13, wherein the computer program further causes the computer hardware system to perform:
- changing a hierarchical position of a non-selected rule element in the hierarchical tree format representation of the rule upon the selected rule element being dropped.

17. The computer readable memory of claim 13, wherein the computer program further causes the computer hardware system to perform:
- displaying a proposed alternative new operator; and
- upon a user selecting the proposed alternative new operator, replacing the new operator with the proposed alternative new operator.

18. The computer readable memory of claim 13, wherein the rules file is a work classification rules file.

* * * * *